(12) United States Patent
Franchet et al.

(10) Patent No.: US 7,441,691 B2
(45) Date of Patent: Oct. 28, 2008

(54) METHOD FOR THE PRODUCTION OF PARTS BY MEANS OF DIFFUSION BONDING AND SUPERPLASTIC FORMING, AND MOLD FOR CARRYING OUT SAID METHOD

(75) Inventors: Jean-Michel Patrick Maurice Franchet, Paris (FR); Gilles Charles Casimir Klein, Mery sur Oise (FR); Olivier Daniel Lamy, Le Havre (FR); Edmond Paul Szkolnik, Bretteville du Grand Caux (FR)

(73) Assignees: SNECMA, Paris (FR); Hurel Hispano, Gonfreville l'Orcher (FR)

( * ) Notice: Subject to any disclaimer, the term of this patent is extended or adjusted under 35 U.S.C. 154(b) by 530 days.

(21) Appl. No.: 10/504,638

(22) PCT Filed: Jan. 10, 2003

(86) PCT No.: PCT/FR03/00061

§ 371 (c)(1),
(2), (4) Date: Feb. 8, 2005

(87) PCT Pub. No.: WO03/057397

PCT Pub. Date: Jul. 17, 2003

(65) Prior Publication Data

US 2005/0121498 A1 Jun. 9, 2005

(30) Foreign Application Priority Data

Jan. 10, 2002 (FR) .................................. 02 00235

(51) Int. Cl.
*B21D 39/00* (2006.01)
*B23K 31/02* (2006.01)
*B23K 20/00* (2006.01)
*B23K 28/00* (2006.01)

(52) U.S. Cl. .......................... 228/157; 228/155; 228/193

(58) Field of Classification Search ................. 228/157, 228/155, 156, 193, 194, 195, 196; 29/421.1
See application file for complete search history.

(56) References Cited

U.S. PATENT DOCUMENTS 3,927,817 A    12/1975   Hamilton et al.
5,683,608 A    11/1997   Matsen et al.
5,797,239 A    8/1998    Zaccone et al.

*Primary Examiner*—Jerry Lorengo
*Assistant Examiner*—Megha Mehta
(74) *Attorney, Agent, or Firm*—Oblon, Spivak, McClelland, Maier & Neustadt, P.C.

(57) ABSTRACT

A method for producing parts including at least one internal cavity. In the method at least two metal sheets are diffusion bonded; then the bonded metal sheets are bent; and then each of internal cavities is inflated by superplastic forming. The method is carried out by a mold allowing at least one first part to be diffusion bonded and then bent while inflating at least one second part by superplastic forming during a single operation, whereby the mold is heated. The method can be applied, e.g., to the field of aeronautics.

12 Claims, 2 Drawing Sheets

METHOD FOR THE PRODUCTION OF PARTS BY MEANS OF DIFFUSION BONDING AND SUPERPLASTIC FORMING, AND MOLD FOR CARRYING OUT SAID METHOD

TECHNICAL FIELD

The technical field of the present invention is that of processes for manufacturing parts using diffusion bonding and superplastic forming methods.

The technical field of the invention also relates to the molds for implementing the processes for manufacturing the parts, such as those mentioned above.

PRIOR ART

Processes for manufacturing hollow parts using diffusion bonding and superplastic forming methods have formed the subject of many disclosures in the prior art.

For example, in the field of the aeronautical industry, methods are known for manufacturing hollow parts formed by metal sheets, which can be implemented so as to produce elements of the jet engine blade type or else elements of the fluid duct type for a turbomachine.

In general, these manufacturing methods comprise several separate steps carried out in succession.

Among these steps, the first consists in carrying out a diffusion bonding operation on a plurality of metal sheets. These metal sheets are superposed one on top of the other and brought into contact with a plane surface of a structure suitable for accommodating them. The assembly formed by the metal sheets is then subjected to a heat source and to an injection of pressurized gas so as to carry out the diffusion bonding and obtain a one-part assembly.

Once this operation has been completed, the assembly obtained must generally undergo a deformation so as to adopt a general shape relatively close to a final shape of a part to be produced. To do this, the assembly is brought into contact with a surface of a mold and then pressed against this surface using pressurized-gas injection means and a heat source, these two elements combined allowing the assembly to be deformed. The surface against which the assembly is pressed has a geometry approximately identical to a geometry of the assembly that it is desired to obtain after this deformation operation has been carried out.

The third and final step of these processes according to the prior art consists in inflating one or more internal cavities of the assembly, for the purpose of producing a part having at least one hollow portion. This operation is carried out using the known technique of superplastic forming, by injecting pressurized gas between the metal sheets of the assembly, while keeping this assembly at high temperature, in a mold, the geometry of an internal wall of which corresponds to the final external geometry of the part to be produced.

Because of the multiplicity of steps to be carried out, the cycle time for producing these parts is long, which generates time and cost constraints. In addition, this type of process requires substantial specific tooling, since three different molds are needed to carry out the steps of the process.

It should be noted that when the part to be produced does not a priori need to undergo the second deformation step, especially when this part has a relatively plane final external geometry, it is then possible to carry out the diffusion bonding step and the superplastic forming step in succession during a single heating operation.

However, this method can in no way be applied to parts of complex geometry, a step of deforming the assembly formed by the sheets bonded together then being necessary.

SUMMARY OF THE INVENTION

The object of the invention is therefore to present a process for manufacturing parts that include at least one internal cavity, said process using in particular the techniques of diffusion bonding and superplastic forming, this process remedying, among others, the abovementioned drawbacks.

The subject of the present invention is therefore to propose a process that considerably simplifies the implementation of the various steps, so as in particular to reduce the cycle time for producing the parts and the amount of components making up the tooling.

The object of the invention is also to provide a mold intended for manufacturing parts that include at least one internal cavity, this mold being furthermore able to be used for carrying out a process meeting the abovementioned object.

To do this, the subject of the invention is firstly a process for manufacturing parts that include at least one internal cavity, this process comprising, in succession, a diffusion bonding step in which at least two metal sheets are bonded together, a deformation step in which an assembly formed by said metal sheets bonded together is deformed, and an inflation step in which each of the internal cavities is inflated by superplastic forming. The process according to the invention is carried out using a mold making it possible, during a single heating operation performed on this mold, to carry out, in succession, the diffusion bonding step and the deformation step on at least one first part lying within a primary recessed portion of the mold, and to carry out the superplastic forming inflation step on at least one second part lying within a secondary recessed portion of the mold.

Advantageously, the process according to the invention leads to a reduction in the cycle time for manufacturing the parts in comparison with the times that would be needed to carry out an entire manufacturing cycle when implementing the processes of the prior art.

In addition, a single operation of heating the mold allows the three steps of the process to be carried out, the first two of which being carried out on at least a first part and the third on at least a second part. Thus, the manufacturing cost of the parts is reduced because of the considerable reduction in the number of furnace-charging operations to be performed.

In the process according to the invention, one advantage lies in the possibility of treating at least two parts simultaneously during a single operation of heating the mold used. This is because a first part is subjected in succession to the diffusion bonding step and then to the deformation step, while a second part undergoes the final, inflation step by superplastic forming.

By implementing the process in such a manner, the number of elements needed to make up the tooling is greatly reduced. A single suitable mold comprising several recessed portions is then required to carry out all the steps of the process according to the invention.

Preferably, for each first part, the diffusion bonding step is carried out by providing, inside the primary recessed portion of the mold, a first injection of pressurized gas that presses the metal sheets against a first plane surface of the primary recessed portion of the mold. Additionally, still in respect of each first part, the step of deforming the assembly formed by said metal sheets bonded together is carried out while purging the pressurized gas introduced into the primary recessed portion during the first injection of gas, and then while providing a second injection of pressurized gas, which presses the metal sheets bonded together against a second surface of the primary recessed portion of the mold.

Advantageously, the process uses a mold comprising a primary recessed portion having surfaces suitable for carrying out the first two steps of the process. Thus, a single recessed portion advantageously makes it possible to present two surfaces against which the metal sheets will be pressed so as to carry out two different operations.

Preferably, for each second part, the inflation step carried out on each of the internal cavities by superplastic forming is performed by providing a third injection of pressurized gas into each of the cavities, the inflation being carried out in such a way that a deformed assembly of at least two sheets bonded together conforms to an internal wall of the secondary recessed portion of the mold.

The single operation of heating the mold is advantageously carried out at a uniform temperature over the entire mold, this temperature preferably being close to about 920° C.

The subject of the invention is also a mold intended for manufacturing parts that include at least one internal cavity. This mold comprises at least one primary recessed portion and at least one secondary recessed portion, each primary recessed portion having a first surface and a second surface, the first surface being plane so as to allow diffusion bonding of at least two metal sheets when the latter are pressed against this first surface, the second surface allowing deformation of the assembly formed by the metal sheets bonded together when this assembly is pressed against this second surface. Moreover, each secondary recessed portion of the mold is capable of accommodating a deformed assembly of metal sheets bonded together and undergoing inflation by superplastic forming, said secondary recessed portion having an internal wall of geometry substantially identical to a final external geometry of a part to be produced.

Preferably, the mold furthermore includes a block comprising one of the first and second surfaces of a primary recessed portion. This block also partly includes an internal wall of a secondary recessed portion.

Advantageously, equalizing the pressure of the two recessed portions separated by a single block such as that described above makes it possible, inter alia, to reduce the bending stresses on this block. It is then conceivable for the mold, and in particular this block, to be lightened, which means that materials of lower strength, and consequently of lower cost, can be used.

Other advantages and features of the invention will become apparent in the following non-limiting description.

BRIEF DESCRIPTION OF THE DRAWINGS

This description will be given in conjunction with the appended drawings, in which.

DETAILED DESCRIPTION OF PREFERRED EMBODIMENTS

Figure 1:
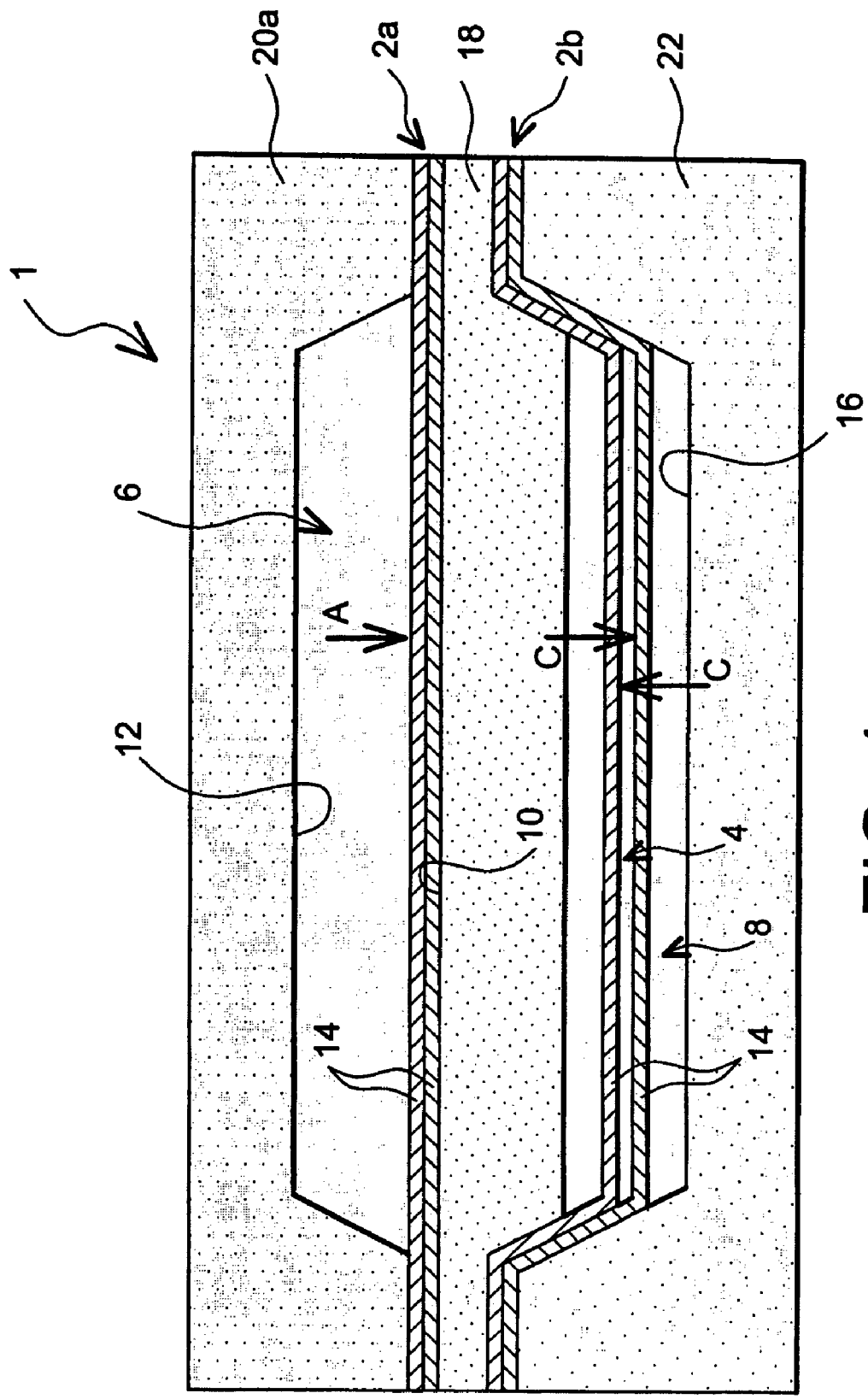
FIG. 1 shows a schematic view of a mold in a preferred embodiment of the invention, when this mold accommodates, on the one hand, metal sheets undergoing diffusion bonding and, on the other hand, a deformed assembly of metal sheets bonded together that undergoes inflation by superplastic forming.
Figure 2:
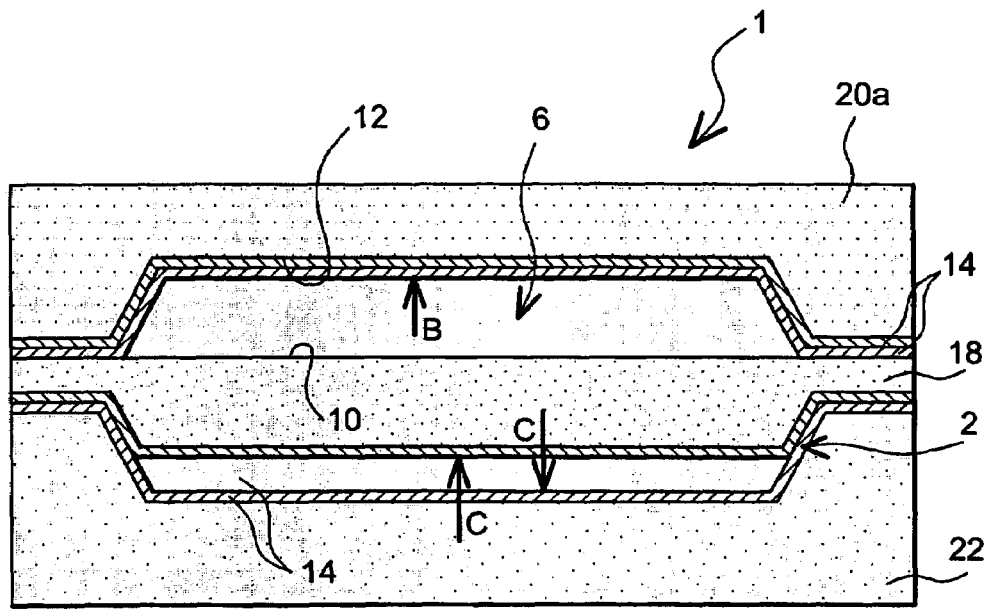
FIG. 2 shows a schematic view of a mold used for implementing a process according to a preferred embodiment of the invention, when the heating operation carried out on this mold has been completed.

Referring to FIGS. 1 and 2, these show a mold 1 intended for manufacturing parts 2 that include at least one internal cavity 4 and preferably just one cavity.

To obtain such hollow parts 2, the mold 1 according to the invention makes use of the known techniques of diffusion bonding and superplastic forming. This is because the mold 1 is used to implement a process for manufacturing parts with the aim of carrying out a diffusion bonding step on at least two metal sheets 14, a deformation step carried out on an assembly formed by at least two metal sheets 14 bonded together and finally an inflation step by the superplastic forming of at least one internal cavity 4 of a deformed assembly comprising at least two metal sheets 14 bonded together.

The mold 1 has at least one primary recessed portion 6 and at least one secondary recessed portion 8. Preferably, as may be seen in FIGS. 1 and 2, the mold 1 has a single primary recessed portion 6 and a single secondary recessed portion 8.

As regards the primary recessed portion 6, this has two surfaces 10, 12 facing each other. Of these surfaces, a first surface 10 is plane, the planarity of this first surface 10 being necessary in order to achieve diffusion bonding of metal sheets 14 that are positioned flat and bear on this first surface 10. The number of metal sheets 14 is preferably two.

The primary recessed portion 6 also has a second surface 12. This second surface 12 may include convex portions and/or concave portions, the object being that this second surface 12 has a geometry approximately similar to a geometry that it is desired to apply by deformation to an assembly comprising metal sheets 14 bonded together, before this assembly is subjected to an inflation operation by superplastic forming.

As regards the secondary recessed portion 8, this is capable of accommodating a deformed assembly of metal sheets 14 bonded together. This secondary recessed portion 8 has an internal wall 16 of geometry approximately identical to a final external geometry of a part 2 to be produced. Thus, during an inflation operation carried out by superplastic forming of a deformed assembly of metal sheets 14 bonded together, this assembly deforms until it conforms to the internal wall 16 of the secondary recessed portion 8 so as to adopt a final external shape corresponding to the shape of a part 2 that it is desired to produce.

The mold 1 also cooperates with various elements allowing the abovementioned various operations to be carried out.

Firstly, the mold is subjected to a heating operation, the applied temperature of which is about 920° C. This temperature may of course be modified by a person skilled in the art, according to his assessment of the criteria, such as the volume of the mold 1 or else the precise composition of the materials making up the metal sheets 14.

In addition, during a phase of manufacturing parts 2, the mold 1 is also connected to various pressurized-gas injection means (not shown).

Thus, the mold 1 is capable of undergoing a first injection of pressurized gas into its primary recessed portion 6 so as to press the metal sheets 14, positioned one on top of the other, against the plane first surface 10 of the primary recessed portion 6 (as shown by the arrow A in FIG. 1). Through the effect of the heating and the injection of pressurized gas applied, the metal sheets 14 then undergo diffusion bonding.

What is thus obtained is an assembly consisting of a single part comprising a plurality of metal sheets 14 bonded together.

FIG. 2 shows the mold 1 is again capable of undergoing an injection of pressurized gas, and again inside this primary recessed portion 6. Before this injection, the gas resulting from the first pressurized-gas injection is purged in order to be replaced with the gas coming from a second injection of pressurized gas. This action has the consequence of pressing and deforming the assembly formed by the metal sheets 14 bonded together, to give this assembly a shape approximately identical to the shape of the second surface 12. The arrow B in FIG. 2 symbolizes the pressing of the metal sheets 14 against the second surface 12.

In the secondary recessed portion 8, a third injection of gas may be provided in order to achieve, using the applied heat, inflation by superplastic forming. The inflation by superplastic forming therefore makes it possible to develop the internal cavity 4 inside the secondary recessed part 8. Thanks to this third injection, the deformed assembly of metal sheets 14 bonded together adopts an external geometry corresponding approximately to the geometry of the internal wall 16 of the secondary recessed portion 8. The metal sheets 14 may then conform to the internal wall 16 of the secondary recessed portion 8 and give the assembly an external shape corresponding to the external shape of a part 2 that it is desired to produce. The arrows C that are visible in FIGS. 1 and 2 symbolize the pressing of the metal sheets 14 against the internal wall 16 of the secondary recessed portion 8.

It may also be noted that, to perform the various injections of pressurized gas, it is possible to use an inert gas, preferably a gas of the argon type.

Again with reference to FIGS. 1 and 2, in a preferred embodiment of the invention, the mold 1 includes a block 18 that separates the primary recessed portion 6 from the secondary recessed portion 8.

This block 18 in fact includes one of the first 10 and second 12 surfaces of the primary recessed portion 6 and also partly includes the internal wall 16 of the secondary recessed portion 8. In other words, this block 18, forming an integral part of the mold 1, has two surfaces, each of which is used to at least partly constitute the primary 6 and secondary 8 recessed portions.

Preferably, the mold 1 comprises an upper block 20a, an intermediate block 18 and a lower block 22. These three blocks are superposed one on top of the other, thus defining the primary recessed portion 6 and the secondary recessed portion 8. This configuration of the mold 1 is particularly beneficial because of the simplicity of the design, but also because of the simplicity that it offers when this mold 1 is being handled. In addition, when the three blocks 18, 20a and 22 of the mold 1 are fastened together, for the purpose of undergoing a heating operation, the various injections of pressurized gas carried out equalize the pressures of the primary and secondary recessed portions 6, 8, thereby greatly reducing the bending stresses on the intermediate block 18. The immediate consequence of such pressure balancing on either side of the intermediate block 18 is therefore the possibility of lightening the latter, thereby consequently reducing the cost of the mold 1.

Figure 3:
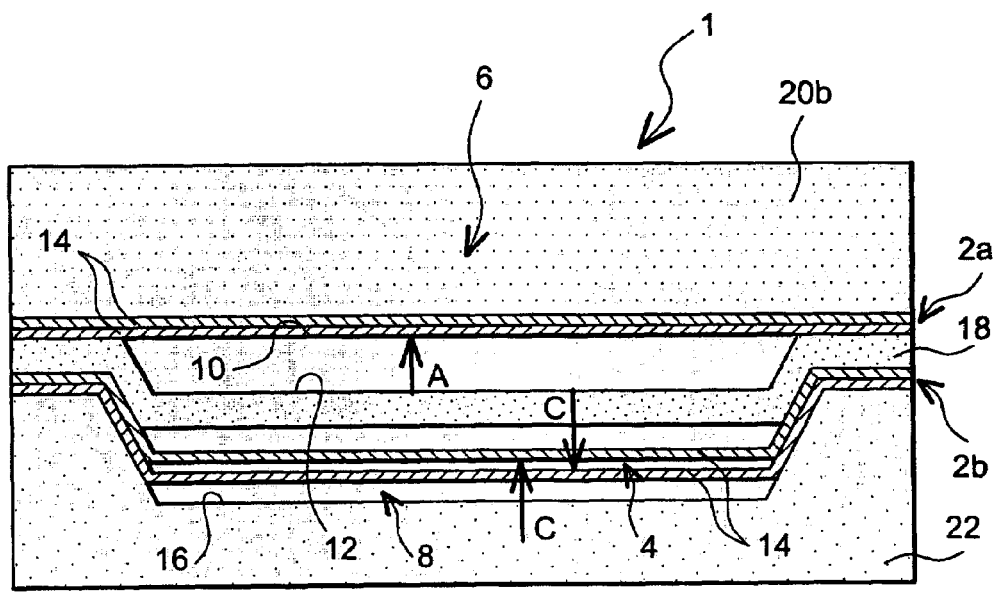
FIG. 3 shows a schematic view of a mold according to another preferred embodiment of the invention, when this mold accommodates, on the one hand, metal sheets that undergo diffusion bonding and, on the other hand, a deformed assembly of metal sheets bonded together that undergoes inflation by superplastic forming.

FIGS. 2 and 3 show that the primary recessed portion 6 lies above the secondary recessed portion 8, these relative positions of one portion with respect to the other possibly being, for example, those adopted when the mold 1 undergoes a furnace operation.

In this situation, it will be possible, as an alternative, to provide for the plane first surface 10 to lie on the intermediate block 18 (FIG. 2), or for this plane first surface 10 to lie on the upper block 20b (FIG. 3). These two possibilities therefore correspond to two different preferred embodiments of the mold according to the invention.

The invention also relates to a process for manufacturing parts 2 that include at least one internal cavity 4. As will be recalled above, the process must perform three separate steps in order to result in a final part 2. These steps include a diffusion bonding step carried out on at least two metal sheets 14, a deformation step carried out on an assembly comprising at least two metal sheets 14 bonded together and finally an inflation step carried out by thermoplastic forming of at least one internal cavity 4 of a deformed assembly of at least two metal sheets 14 bonded together.

To implement this process, a mold 1 is used that is made to undergo a single heating operation, preferably at a temperature of about 920° C.

During this single operation of heating the mold 1, the process according to the invention is able to treat several parts 2a, 2b at the same time, by making them undergo different steps depending on the recessed portion of the mold 1 in which they are found.

Preferably, the process treats two parts 2a, 2b simultaneously.

It should therefore be noted that there is a first part 2a and a second part 2b, the first part 2a undergoing the successive operations of diffusion bonding and deformation in a primary recessed portion 6, while the second part 2b undergoes, during the same furnace treatment, an inflation operation by superplastic forming in a secondary recessed portion 8.

There are therefore three operations carried out during the same heating of a single mold 1, whereas the processes of the prior art consist of three separate and successive heating steps, using in addition three different molds.

As may be seen in FIG. 2, at the end of each part manufacturing cycle, that is to say when the single operation of heating the mold 1 has been completed, what is obtained is a part 2 having a geometry approximately identical to the geometry of a final part to be produced, this part 2 lying in the secondary recessed portion 8.

In addition, there is also a deformed assembly of metal sheets 14 bonded together lying in the primary recessed portion 6, this assembly being intended, during a following heating cycle of the mold 1, to be positioned in the secondary recessed portion 8 so as to undergo inflation of its internal cavity 4 by superplastic forming.

This process is particularly beneficial within the context of the production of hollow parts used in the aeronautical industry.

Of course, various modifications may be made by a person skilled in the art to the process and to the mold that have just been described solely by way of non-limiting examples.

The invention claimed is:

1. A process for manufacturing parts that include at least one internal cavity, the process comprising:
   providing, in a primary recessed portion of a mold, a first part comprising two metal sheets;
   providing, in a secondary recessed portion of said mold, a second part comprising two metal sheets;
   bonding said two metal sheets of said first part together by diffusion bonding thereby forming a first assembly of metal sheets;
   deforming said first assembly of metal sheets; and
   inflating a cavity between said two metal sheets of said second part by superplastic forming, wherein said bonding, said deforming and said inflating are performed during a single heating operation performed on the mold.

2. The manufacturing process as claimed in claim 1, wherein, for said first part, the diffusion bonding is carried out by providing, inside the primary recessed portion of the mold, a first injection of pressurized gas that presses the two metal sheets of said first part against a first plane surface of the primary recessed portion of the mold.

3. The manufacturing process as claimed in claim 2, wherein, for said first part, the deforming of the first assembly formed by the two metal sheets of the first part bonded together is carried out while purging the pressurized gas introduced into the primary recessed portion during the first injection of gas, and then while providing a second injection of pressurized gas, which presses the two metal sheets of the first part bonded together against a second surface of the primary recessed portion of the mold.

4. The manufacturing process as claimed in claim 1, wherein, for said second part, the inflating carried out on the internal cavity by superplastic forming is performed by providing an injection of pressurized gas into the internal cavity, the inflating being carried out such that a deformed second assembly of the metal sheets of the second part bonded together conforms to an internal wall of the secondary recessed portion of the mold.

5. The manufacturing process as claimed in claim 1, wherein the single operation of heating the mold is carried out at a temperature of about 920° C.

6. The manufacturing process as claimed in claim 1, wherein said inflating comprises inflating a plurality of cavities between said two metal sheets of said second part.

7. The manufacturing process as claimed in claim 1, further comprising, during said single heating operation performed on the mold:

bonding said two metal sheets of said second part together by diffusion bonding thereby forming a second assembly of metal sheets;

deforming said second assembly of metal sheets.

8. The manufacturing process as claimed in claim 1, wherein said providing of said first and second parts respectively in said primary and secondary recessed portions is performed such that said first and second parts are separated from each other by an intermediate block of said mold.

9. The manufacturing process as claimed in claim 8, wherein said bonding of said two metal sheets of said first part is performed by pressing said first part against a planar surface of said intermediate block.

10. The manufacturing process as claimed in claim 9, wherein said deforming of said first part is performed by pressing said first part against a surface of said primary recessed portion of said mold opposite to said planar surface of said intermediate block.

11. The manufacturing process as claimed in claim 1, further comprising, after said step of providing said first and second parts respectively in said primary and secondary recessed portions of said mold, subjecting said mold to said single heating operation thereby heating said first and second parts above a predetermined temperature, and wherein said bonding, said deforming and said inflating are performed while said first and second parts are above said predetermined temperature.

12. The manufacturing process as claimed in claim 11, wherein said bonding, said deforming and said inflating are performed while said first and second parts are maintained at a substantially constant temperature above said predetermined temperature.

* * * * *